United States Patent [19]

Purcell et al.

[11] 4,230,378
[45] Oct. 28, 1980

[54] RESILIENT SUPPORT PAD FOR CRAWLER TYPE VEHICLES

[75] Inventors: Robert J. Purcell; James R. Sturges, both of Washington, Ill.

[73] Assignee: Caterpillar Tractor Co., Peoria, Ill.

[21] Appl. No.: 886,185

[22] Filed: Mar. 13, 1978

Related U.S. Application Data

[63] Continuation of Ser. No. 785,625, Apr. 7, 1977, abandoned.

[51] Int. Cl.² ............... B62D 55/16; F16F 1/44; B60G 11/22
[52] U.S. Cl. ..................... 305/22; 267/63 R; 305/27
[58] Field of Search ............... 305/22, 27, 28; 267/153, 141, 63 R; 260/763

[56] References Cited

U.S. PATENT DOCUMENTS

| | | | |
|---|---|---|---|
| 3,410,573 | 11/1968 | Hickman | 267/63 R |
| 3,826,325 | 7/1974 | Purcell et al. | 305/22 |
| 3,862,259 | 1/1975 | Russelt et al. | 260/763 X |

*Primary Examiner*—David A. Scherbel
*Attorney, Agent, or Firm*—Charles E. Lanchantin, Jr.

[57] ABSTRACT

A unitary bogie pad has a base portion, an intermediate portion, and a cap portion each of a generally round horizontal cross sectional configuration. The base portion is of a columnar configuration, the intermediate portion has outer annular walls sloping generally inwardly, and the cap portion is of a generally domed configuration. The base portion has a bottom surface and an outer surface hingedly connected to the bottom surface.

24 Claims, 12 Drawing Figures

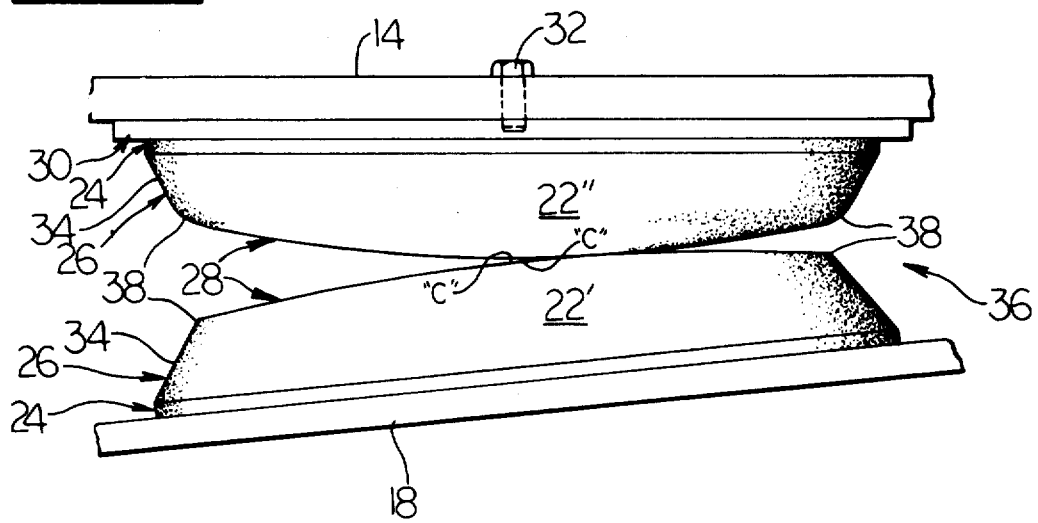
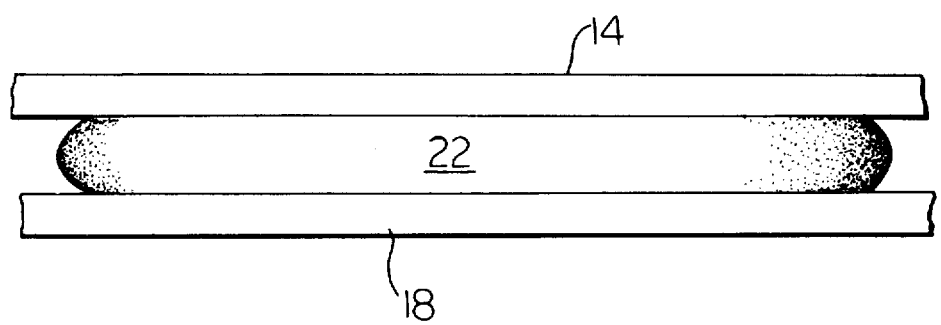
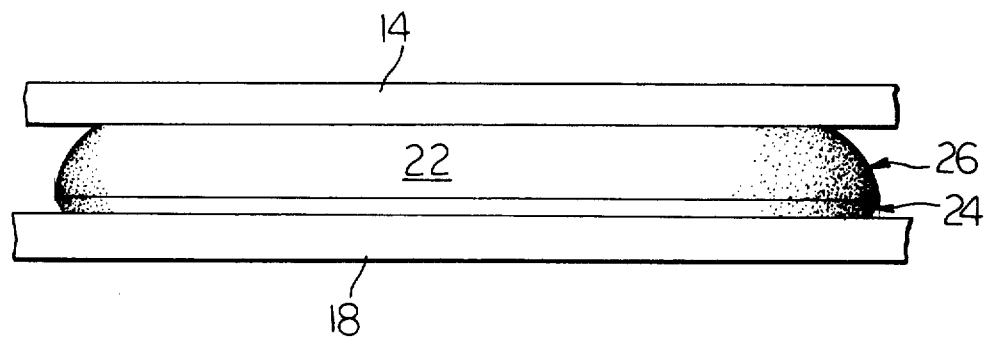

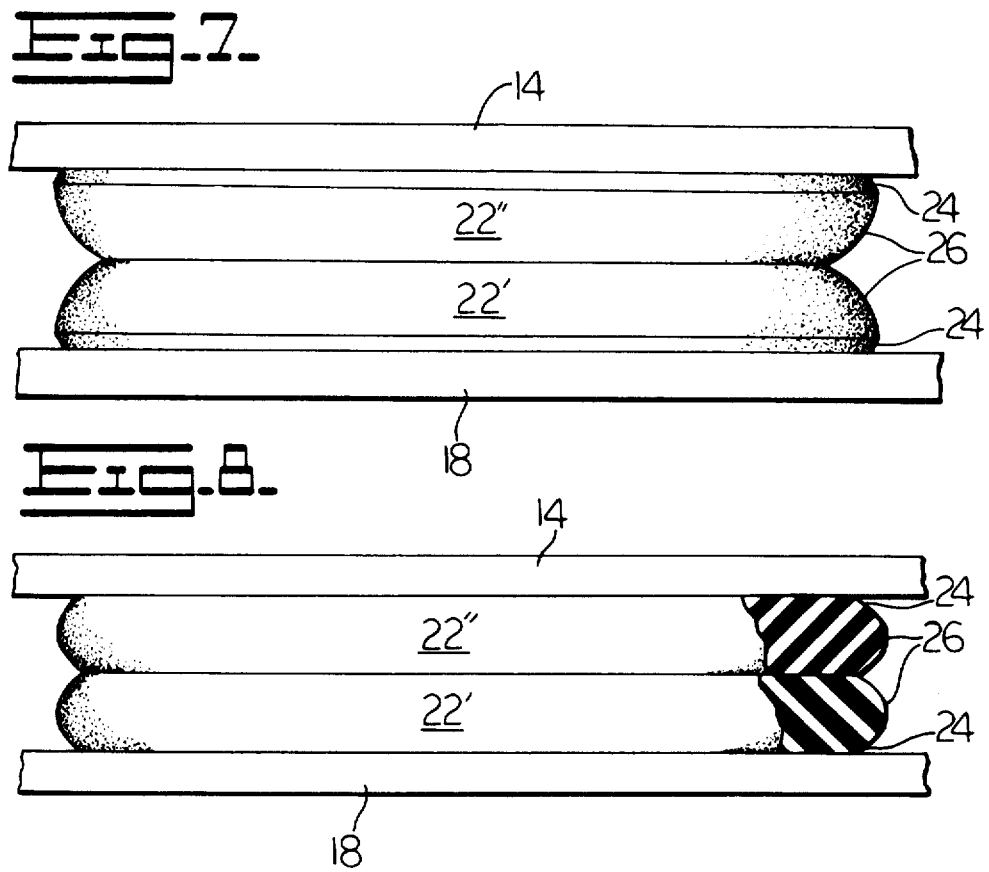
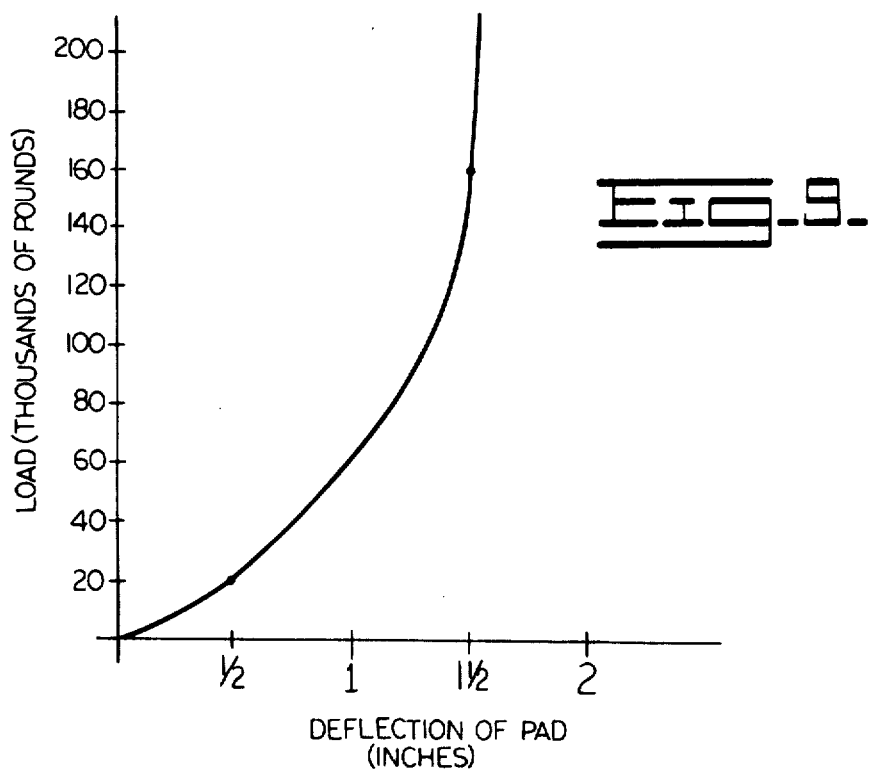

RESILIENT SUPPORT PAD FOR CRAWLER TYPE VEHICLES

CROSS REFERENCE TO RELATED APPLICATION

This application is a Continuation of Application Ser. No. 785,625 filed Apr. 7, 1977, now abandoned.

BACKGROUND OF THE DISCLOSURE

Heretofore utilized bogie pads, particularly those utilized in crawler type vehicles, were generally made of rubber and had an operational life less than desirable. After considerable research, it was discovered that the configuration of the undeflected bogie pad was a determining factor in its life period.

During use of the bogie pads, internal triaxial stresses are subjected onto the pad. It was discovered that these stresses could be moved within and be minimized by changing the configuration of the bogie pad.

Bogie pads are subjected to a great deal of abuse, adverse conditions, and extremely heavy impacts. It was desirable to provide a bogie pad which could withstand these adverse operating conditions while remaining operable for longer periods of time.

The present invention is directed to overcoming one or more of the problems as set forth above.

SUMMARY OF THE INVENTION

According to one aspect of the present invention, a resilient support pad has a base portion, an intermediate portion, and a cap portion each of a generally round horizontal cross sectional configuration. The base portion is of a columnar configuration, the intermediate portion has outer annular walls sloping generally inwardly, and the cap portion is of a general domed configuration. The base portion has a preselected height in a range of about 3.5% to about 26% of the overall height of the resilient support pad.

According to another aspect of the invention a crawler type vehicle has a frame, an arm pivotably connected to the frame, a plate releasably connected to the frame or arm, and a resilient support pad of a preselected construction bonded to the plate. The resilient support pad has a domed cap portion, an intermediate portion having generally inwardly sloping walls, and a columnar base portion each of generally round cross section. Advantageously, the base portion has a preselected height in a range of about 3.5% to about 26% of the overall height of the resilient support pad.

With such positively defined resilient support pad construction the outer surface of the base portion generally pivots about the bottom surface of the base portion under initial loading of the pad in a manner comparable to a hinge.

BRIEF DESCRIPTION OF THE DRAWINGS

FIG. 4 is a diagrammatic frontal view of a bogie pad system;

FIG. 5 is a diagrammatic frontal view of a bogie pad in a partially loaded condition;

FIG. 6 is a diagrammatic frontal view of a bogie pad in a fully loaded condition;

FIG. 7 is a bogie pad system in a partially loaded condition;

FIG. 8 is a bogie pad system in a fully loaded condition;

FIG. 9 is a load-deflection curve of the bogie pad;

DETAILED DESCRIPTION

Figure 1:
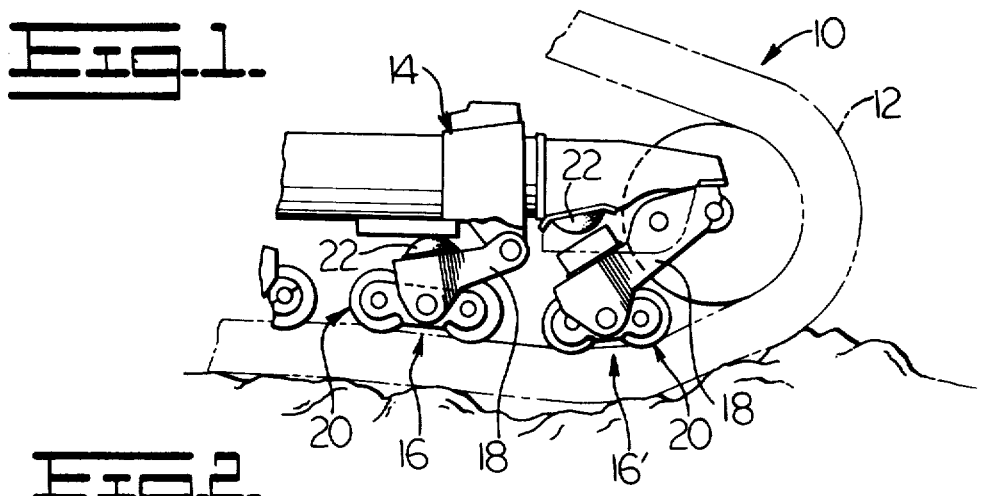
FIG. 1 is a diagrammatic view of a portion of a crawler type vehicle having the bogie pad of this invention.

Referring to FIG. 1, a crawler type vehicle 10, for example a crawler type tractor, has continuous track 12 for locomotion. The vehicle 10 has a frame 14 and at least one bogie assembly 16 associated with each track 12. The bogie assembly 16 includes a bogie arm 18 pivotally connected at one end to the frame and has a track roller system 20 connected at the other end. The arm 18 is pivotally movable relative to the frame for supporting the associated track 12 with the rollers 20 during movement of the track 12 toward and from the frame 14, as is well known in the art.

By the term frame 14, as used herein, it is meant any supporting structure suitable that is maintained at a preselected location relative to the vehicle 10.

At least one unitary bogie pad or resilient support pad 22 is fixedly connected to the bogie arm 18, as shown in bogie assembly 16 or to the frame 14 as shown in bogie assembly 16'. The bogie pad 22 extends outwardly from the connecting structure 14 or 18 and is positioned at a location between the frame 14 and bogie arm 18 and is of a size sufficient for contacting the other structure 14 or 18 in response to pivotal movement of the bogie arm 18 toward the frame 14 for controllably damping the movement of said arm 18.

Figure 2:
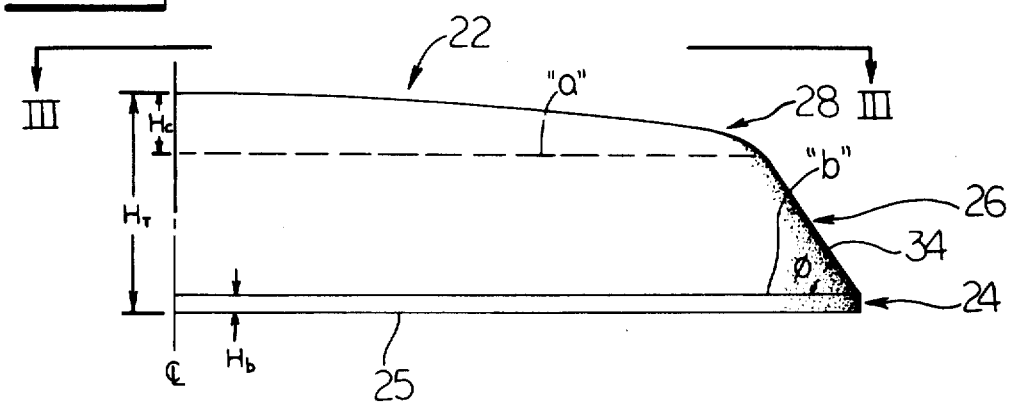
FIG. 2 is a diagrammatic frontal view of the bogie pad in an unloaded condition.
Figure 3:
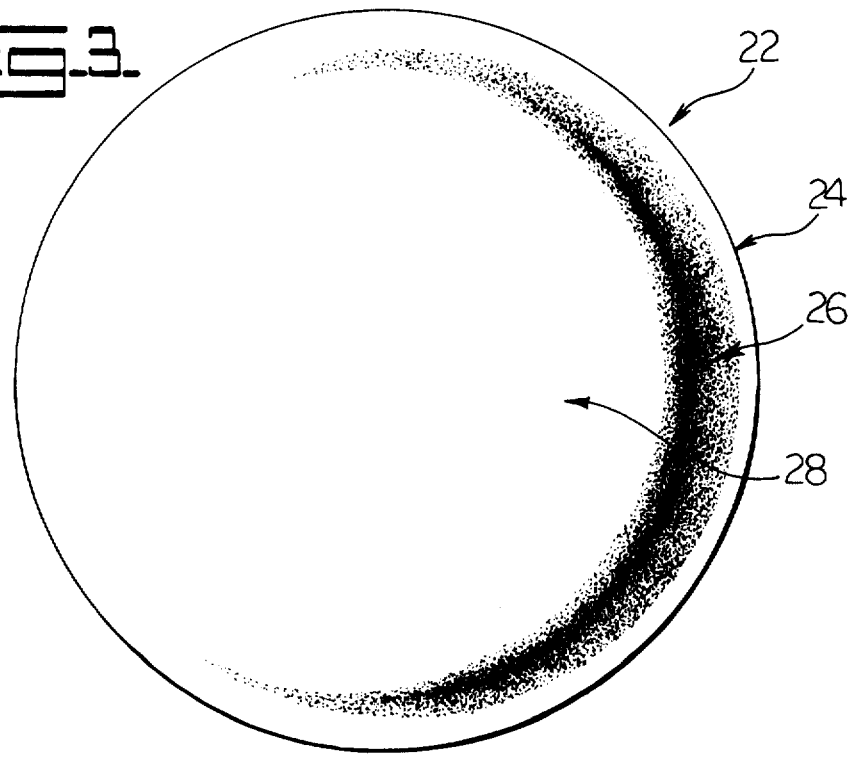
FIG. 3 is a diagrammatic top view of the bogie pad in an unloaded condition.

Referring to FIGS. 2 and 3, the bogie pad 22 has a base portion 24, an intermediate portion 26, and a cap portion 28. Each of the portions 24, 26, 28 are of a generally round horizontal cross sectional configuration, as can be seen in FIG. 3, with said configurations preferably being circular. It is contemplated that the term "generally round" as used herein embraces elliptical cross sections of the pad.

Figure 10:
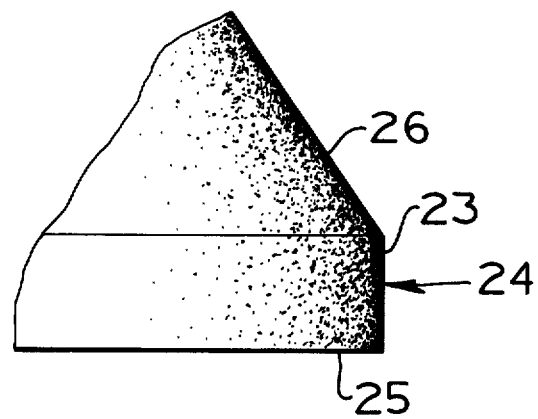
FIG. 10 is a somewhat enlarged diagrammatic frontal view of the bogie pad in an unloaded condition similar to FIG. 2.
Figure 11:
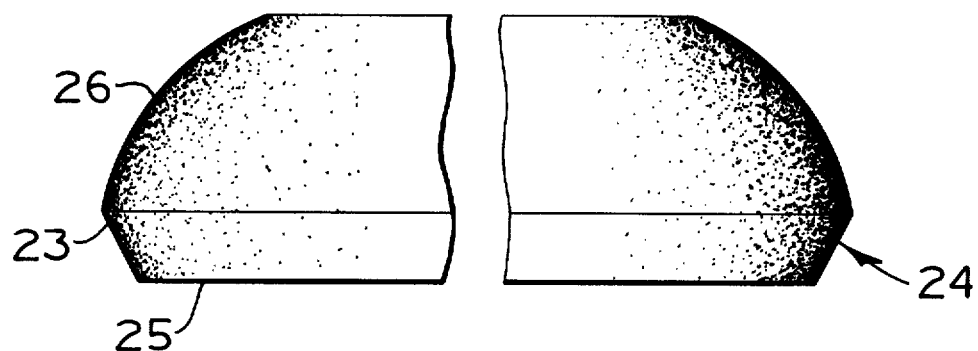
FIG. 11 is a somewhat enlarged diagrammatic frontal view of the bogie pad in a partially loaded condition similar to FIG. 5.
Figure 12:
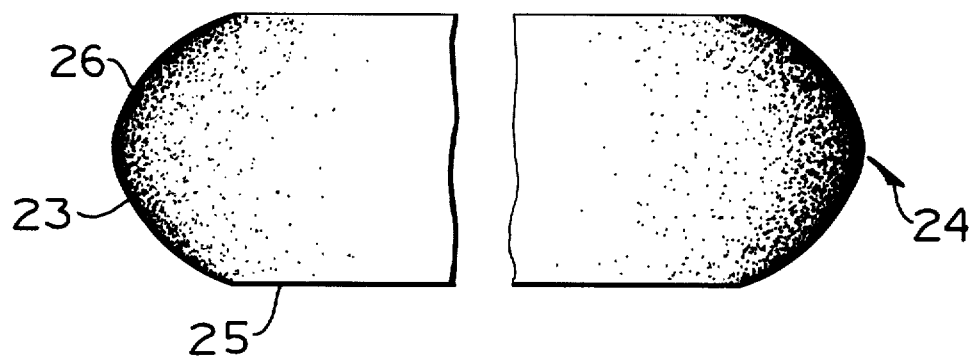
FIG. 12 is a somewhat enlarged diagrammatic frontal view of the bogie pad in a fully loaded condition similar to FIG. 6.

The base portion 24 has an outer surface 23 and a bottom surface 25 (FIGS. 10-12). The bottom surface 25 is connected to a respective frame 14 or bogie arm 18. The bottom surface 25 can be directly connected to the frame 14 or bogie arm 18 by bonding in any suitable manner or can be indirectly connected to the frame 14 or bogie arm by bonding the bogie pad 22 to a supporting plate 30 and connecting the supporting plate 30 to said frame 14 or bogie arm 18 by any suitable fastening means 32, as shown in FIG. 4.

The intermediate portion 26 has outer annular walls 34 which slope generally inwardly forming a frustum in the undeflected condition of the pad 22. The cap portion 28 is of a generally domed configuration and has a generally arcuate outer surface.

Lines "a" and "b" have been designated on FIG. 2 to indicate the lines of demarcation between the various portions, 24, 26, 28.

Referring to FIG. 4, a bogie pad system 36 is shown wherein a bogie pad 22', 22" is positioned on a respective frame 14 and bogie arm 18 at locations where one bogie pad 22' contacts the other adjacent bogie pad 22" during pivotal movement of the bogie arm 18. In the bogie pad system 36, the pads 22', 22" are of a configuration and are positioned at locations sufficient for initially contacting one another at locations between the center "c" of each arcuate outer surface pad and outer edge 38 of the cap portion 28 in response to pivoting of the bogie arm 18. This construction of a pad 22 and positioning is also maintained where only a single pad 22 is utilized, as shown in FIG. 1. The initial contact point of the pad is likewise spaced from the center "c" and the outer edge portion 38 of the cap portion 28.

By so locating the initial contacting point, the operational life of the pad 22 is markedly increased by assuring against the introduction of additional shear stresses in the pad in response to initially contacting an intermediate portion 26 of the pad 22 or the outer edge portion 38 of the cap portion 28. As set forth above, the bogie arm 18 is pivotally movable and the pad pathway is arcuate. Therefore, during design of the pad 22, the radius of the arc must be taken into consideration in order to assure the preselected initial contacting point of the pad 22.

The outer surface of the dome shaped cap portion 28 of the bogie pad 22 can be defined by an arc of a single radius, as in pad 22' or of a plurality of radii, as in pad 22".

The base portion 24 of the bogie pad 22 has a preselected bottom surface 25 area based upon the total weight of the vehicle 10. The total area of the bottom surface 25 of each pad 22 is defined by the expression $$Area = T/C$$

where
 C = The nominal compressive stress of the rubber in the range of about 3500 to about 8300 kPa (500-1200 psi)
 T = Total weight of vehicle upon which pad is expected to be used.

A pad 22 of greater area is undesirable owing to the facts that material and space on the vehicle will be wasted. A pad 22 of lesser area is undesirable owing to the facts that undesirable pressures will be subjected onto the pad 22 and the operational life of the resultant pad 22 will be less than desirable.

At a nominal compressive stress "C" less than about 3500 kPa (500 psi) the bogie pad is undesirably large in size and wastes space on the vehicle and causes associated equipment to be unnecessarily large which also represents waste. At a "C" greater than 8500 kPa (1230 psi) the bogie pad is subjected to stresses of a sufficiently high magnitude as to cause the operational life of the resultant pad to be undesirably short.

Referring to FIGS. 10-12, which show the base portion 24 in larger detail than FIGS. 2, 5 and 6, respectively, the outer surface 23 of the base portion 24 of the bogie pad 22 is hingedly connected to the bottom surface 25 of the pad 22. By hingedly connected it is meant that there is movement between the outer surface 23 and bottom surface 25 similar to that of a hinge. A hinge typically has two parts connected by a pin so that the first part moves or pivots about the pin while the second part remains stationary relative to the first part. In the bogie pad 22, the outer surface 23 moves relative to the bottom surface 25 when the pad 22 is partially loaded (FIGS. 10-11). The outer surface 23 initially remains substantially straight and pivots at the connection of the outer surface 23 and bottom surface 25 (FIG. 11). As the pad 22 becomes fully loaded, the outer surface 23 deforms adjacent the intermediate portion to which the outer surface 23 is connected (FIG. 12).

The base portion 24 also should be constructed with a height "$H_b$" in the range of about 2 to about 15 mm (0.08-0.6"). At lesser heights of the base portion 24, the pad will undesirably hinge at a location within the intermediate portion 26 which will introduce undesirable stresses in the pad 22 and result in an undesirable operational life. At greater heights of the base portion 24, the pad will undesirably hinge within the base portion 24 which will introduce undesirable stresses in the pad 22 and result in an undesirable operational life.

With a base height maintained as set forth in the above-cited equation, the hinging of the pad will be maintained at the connection of the bottom surface 25 to the outer surface 23.

The overall height of the pad 22 is based on the compression of the pad. It is preferred that the bogie pad have a maximum compression value for the intended use in a range of about 13 to about 76 mm (0.5-3.0"). Maximum compression values less than about 13 mm (0.5") are undesirable because the bogie arm will not have sufficient damped travel. Maximum compression values greater than about 76 mm (3.0") are undesirable because the vehicle will have undesirable working tool stability. The maximum compression value is preferably about 38 mm (1.5"). The overall height of the bogie pad is constructed so that the maximum compression travel is in the range of 20% to 40% of the overall height $H_t$.

Referring to FIGS. 5 and 7, the pad or pads 22 are preferably of a dimension sufficient for deflection of substantially the entire cap portion 28 to a substantially planar surface in the installed position of the pads 22 on a standing vehicle with said pads supporting the vehicle weight. Under these stable load conditions, it will be noticed that the base portion 24 has hingedly moved outwardly and that the intermediate portion 26 has moved outwardly.

Referring to FIGS. 6 and 8, the pad or pads 22 are subjected to the maximum expected load and the base and intermediate portions 24, 26 are further outwardly extending.

The pads 22 are preferably formed of natural rubber having carbon black therein and being substantially free of reinforcing elements of other material. By the term reinforcing elements of other materials it is meant mechanical reinforcing materials such as wire, cords, meshes, and the like, and does not refer to chemical reinforcing elements such as the carbon black and other chemical binders used in the forming of rubber.

Referring to FIG. 9, it can be seen that the pad 22 of the above described construction has load deflection properties at which the load-deflection curve of the pad at maximum expected load is substantially vertical.

In the example pad, hereinafter described, the static load on the pad is about 9070 Kg (20,000 lbs) and the maximum expected load is 72 575 Kg (160,000 lbs). It should be noticed that the deflection of the pad between the static and maximum load is about 25 mm(1") with a 38 mm(1.5") maximum compression.

This is particularly significant where it is realized that the unique construction of the pad of this invention minimizes load stresses within the pad to the extent that the pad has unexpected operational life while being subjected to 40% and greater deflection. Heretofore utilized pads of other construction would experience drastically reduced operational life at such heavy loads and great deflections.

The following is a preferred example bogie pad 22 of this invention.

| PREFERRED INGREDIENT | PREFERRED MATERIAL FORMULATION BRAND NAME AND SOURCE | PARTS (BY WEIGHT) |
|---|---|---|
| No. 1 Ribbed Smoked Sheet | — | 100.0 |
| FEF Carbon Black | STATEX M-COLUMBIAN CARBON CO. | 70.0 |
| PROCESS OIL | CIRCO LIGHT RUBBER PROCESS OIL-SUNOIL CO. | 10.0 |
| STEARIC ACID | STEARIC ACID C.P. HALL CO. | 2.0 |
| ZINC OXIDE | PROTOX 166 NEW JERSEY ZINC CO. | 5.0 |
| SULFUR | SPIDER BRAND OLIN CORP. | 2.75 |
| ANTIOXIDANT | OCTAMINE UNIROYAL CHEMICAL DIV. | 1.0 |
| ACCELERATOR | SANTOCURE MOR-MONSANTO CO. | 0.90 |
| PRE-VULCANIZATION INHIBITOR | SANTOGARD PVI MONSANTO CO. | 0.25 |

PROCESSING

A. MIXING
1. 0.5 PARTS PEPTIZER ENDOR - E.I. DU PONT PER HUNDRED RUBBER FOR PREMASTICATION.
2. NO OILS OR PROCESSING AIDS EXCEPT AMOUNT OF OIL SHOWN IN FORMULATION.
3. COMPOUNDING INGREDIENTS ARE WELL DISPERSED.
4. A TWO STAGE MIXING PROCEDURE. ALL INGREDIENTS EXCEPT CURATIVE (SULFUR, SANTOCURE MOR, AND SANTOGARD) ARE MIXED INTO THE PREMASTICATED RSS NO. 1 AND COOLED. THE CURATIVE ARE ADDED IN A SECOND STEP IN A MIXER.

B. MOONEY VISCOSITY AND SCORCH TIME OF MIXED STOCK PRIOR TO MOLDING:
   VISCOSITY - ML1 + 4 - 100° C. (212° F.)        65
   SCORCH - (ML) 135° C. (275° F.)
   TIME TO 5 POINT RISE                           15 MINUTES

C. RHEOMETER CURED CHARACTERISTICS (ASTM D2084)
1. PLATEN TEMPERATURE - 148° C. (298° F.0  OSCILLATION - 1.67Hz (100 cpm)
   PREHEAT TIME- 0 SEC.                    CHARTMOTOR - 60 MIN.
   1. $M_L$ (MIN. TORQUE)                  1.0 N.m (8.4 lb.in)
   2. $M_H$ (MAX. TORQUE)                  4.7 N.m (41.6 lb.in)
   3. $T_2$ (SCORCH TIME)                  8.7 MINUTES
   4. $T_{C95}$ (CURE TIME)                20.1 MINUTES
2. PLATEN TEMPERATURE- 162° C. (324° F.)   OSCILLATION - 167Hz (100 cpm)
   PREHEAT TIME - 0 SEC.                   CHARTMOTOR - 60 MIN.
   1. $M_L$ (MIN. TORQUE)                  0.9 N.m (8.0 lb.in)
   2. $M_H$ (MAX. TOQUE)                   4.4 N.m (38.9 lb.in)
   3. $T_2$ (SCORCH TIME)                  3.7 MINUTES
   4. $T_{C95}$ (CURE TIME)                8.6 MINUTES

PROPERTIES

1. HARDNESS (ASTM D2240)            70 SHORE A
2. TENSILE STRENGTH (ASTM D412)     18.6 MPa (2700 psi)
3. ELONGATION (ASTM D412)           325%
4. 100% MODULUS (ASTM D412)         4.8 MPa (700 psi)
5. 300% MODULUS (ASTM D412)         18.6 MPa (2700 psi)
6. TEAR STRENGTH ASTM (D624-DIEC)   525 N/cm (300 lb/in) MIN.
7. COMPRESSION SET (ASTM D395 - METHOD B) ASTM BUTTONS CURED 30 MIN. AT 148° C. (298° F.) SET AFTER 22 HOURS AT 70° C. (158° F.)
8. COMPRESSIVE MODULUS ASTM (D575) -METHOD A) AT 25% DEFLECTION    2.9 MPa (425 PSI)
9. SPECIFIC GRAVITY                 1.165

AIR OVEN AGING (ASTM D573 −70 HOURS at 70° C.)(158° F.)
1. HARDNESS CHANGE       +10 MAXIMUM
2. TENSILE CHANGE        ±20%
3. ELONGATION CHANGE     −25% MAXIMUM
4. SURFACE CONDITION     NO CRACKS

-continued

| PREFERRED MATERIAL | |
|---|---|
| PREFERRED DIMENSIONS | |
| 1. BASE DIAMETER | 360 mm (14.20") |
| 2. TOTAL OVERALL HEIGHT $H_t$ | 57 mm ( 2.25") |
| 3. CROWN HEIGHT $H_c$ | 13 mm ( 0.50") |
| 4. HEIGHT OF BASE $H_b$ | 5 mm ( 0.20") |
| 5. ANGLE $\phi$ | 55° |

The subject example pad has been tested with 72 575 Kg load. The test example bogie pad has presently been compressed to the maximum design compression through 2,000,000 cycles and remains in operating condition.

The embodiments of the invention in which an exclusive property or privilege is claimed are defined as follows:

1. A unitary resilient support pad (22) for use on a vehicle (10), the support pad (22) comprising:
    a base portion (24), an intermediate portion (26), and a cap portion (28) each of a generally round horizontal cross sectional configuration and defining an overall height Ht, the base portion (24) being of a columnar configuration and having a preselected height Hb, the intermediate portion (26) having outer annular walls (34) sloping generally inwardly, the cap portion (28) being of a general domed configuration, and the preselected height Hb of the base portion (24) being in a range of about 3.5% to about 26% of the overall height Ht; and wherein the base portion (24) has a bottom surface (25) having a preselected area defined by the expression "Area = T/C" wherein:
    C = a constant in a range of about 3500 to about 8300 kPa.
    T = total weight of the vehicle (10) upon which the pad (22) is to be used.

2. A unitary resilient support pad (22) for use on a vehicle (10), the support pad comprising:
    a base portion (24), an intermediate portion (26), and a cap portion (28) each of a generally round horizontal cross sectional configuration and defining an overall height Ht, the base portion (24) being of a columnar configuration and having a preselected height Hb, the intermediate portion (26) having outer annular walls (34) sloping generally inwardly, the cap portion (28) being of a general domed configuration, and the preselected height Hb of the base portion (24) being in a range of about 3.5% to about 26% of the overall height Ht; and wherein the support pad (22) is of a dimension sufficient for deflection of substantially the entire cap portion (28) to a substantially planar surface in response to the support pad (22) being installed on the vehicle (10) and experiencing a standing loading.

3. A unitary resilient support pad (22) for use on a vehicle (10), the support pad comprising:
    a base portion (24), an intermediate portion (26), and a cap portion (28) each of a generally round horizontal cross sectional configuration and defining an overall height Ht, the base portion (24) being of a columnar configuration and having a preselected height Hb, the intermediate portion (26) having outer annular walls (34) sloping generally inwardly, the cap portion (28) being of a general domed configuration, and the preselected height Hb of the base portion (24) being in a range of about 3.5% to about 26% of the overall height Ht; and wherein the support pad (22) has a preselected load deflection curve in use on the vehicle (10) and is of dimensions sufficient for providing load-deflection properties at which the load deflection curve of the support pad (22) at maximum expected load is substantially vertical.

4. A crawler type vehicle (10) comprising:
    a frame (14);
    an arm (18) pivotally connected to the frame (14);
    a plate (30) releasably connected to one of the frame (14) and the arm (18); and
    a resilient support pad (22) bonded to the plate (30) and disposed at a location between the frame (14) and the arm (18), the resilient support pad (22) having a base portion (24), an intermediate portion (26), and a cap portion (28) each of a generally round horizontal cross sectional configuration and defining an overall height Ht, the base portion (24) being of a columnar configuration and having a preselected height Hb, the intermediate portion (26) having outer annular walls (34) sloping generally inwardly, the cap portion (28) being of a general domed configuration, and the preselected height Hb of the base portion (24) being in a range of about 3.5% to about 26% of the overall height Ht.

5. The crawler type vehicle (10) of claim 4 wherein the intermediate portion (26) is a frustum.

6. The crawler type vehicle (10) of claim 4 wherein each of the base, intermediate, and cap portions (24,26,28) has a circular horizontal cross sectional configuration.

7. The crawler type vehicle (10) of claim 4 wherein the base portion (24) has a bottom surface (25) having a preselected area defined by the expression "Area = T/C" wherein:
    C = a constant in a range of 3500 to about 8300 kPa.
    T = total weight of the crawler type vehicle (10).

8. The crawler type vehicle (10) of claim 4 wherein the resilient support pad (22) is of a dimension sufficient for deflection of substantially the entire cap portion (28) to a substantially planar surface at the installed position of the resilient support pad (22) on the vehicle (10) in a standing mode of operation.

9. The crawler type vehicle (10) of claim 4 wherein the cap portion (28) has a generally arcuate outer surface having a center (c) and an outer edge (38), the support pad (22) being of a configuration and positioned at a location sufficient for contacting the other of the frame (14) and arm (18) at a location on the cap portion (28) spaced from the center (c) and the outer edge (38) in response to pivoting of the arm (18).

10. The crawler type vehicle (10) of claim 4 including another resilient support pad (22) connected to the other one of the frame (14) and the arm (18), each of the resilient support pads (22) contacting and loading one another in response to pivoting of the arm (18).

11. The crawler type vehicle (10) of claim 10 wherein the cap portion (28) of each resilient support pad (22) has an arcuate outer surface defining a center (c) and an outer edge (38) and the resilient support pads (22) are of a construction sufficient for contacting the cap portions (28), one with the other at locations spaced from their respective centers (c) and outer edges (38) in response to pivoting of the arm (18).

12. A unitary resilient support pad (22) for use on a vehicle (10) and connection to a plate (30), the support pad comprising:
 a base portion (24), an intermediate portion (26), and a cap portion (28) each of a generally round horizontal cross sectional configuration and defining an overall height Ht, the base portion (24) being of a columnar configuration and defining a peripheral outer wall surface (23) and a bottom surface (25) and having a preselected height Hb, the intermediate portion (26) having outer annular walls (34) sloping generally inwardly, the cap portion (28) being of a general domed configuration, and the preselected height Hb of the base portion (24) being in a range of about 3.5% to about 26% of the overall height Ht; and wherein the bottom surface (25) is bonded to plate (30) and the outer wall surface (23) remains substantially straight in vertical cross section and pivots at the connection of the outer wall surface (23) and the bottom surface (25) in response to the application of a partial load on the cap portion (28).

13. The support pad (22) of claim 12 wherein the maximum compression travel is in the range of about 20% to 40% of the overall height Ht.

14. A vehicle (10) comprising:
 a frame (14);
 an arm (18) pivotally connected at one end to the frame (14);
 a pair of plates (30) releasably connected to a respective one of the frame (14) and (arm);
 a pair of resilient support pads (22) individually bonded to the plates (30), each resilient support pad (22) having a domed cap portion (28), an intermediate portion (26) having generally inwardly sloping walls (34), and a columnar base portion (24) each of a generally round horizontal cross sectional configuration and defining an overall height Ht, the columnar base portion (24) having a preselected height Hb in a range of about 3.5% to about 26% of the overall height Ht, and the resilient support pads (22) contacting and loading one another in response to pivoting of the arm (18).

15. The vehicle (10) of claim 14 wherein said intermediate portion (26) is a frustum.

16. The vehicle (10) of claim 15 wherein the sloping walls (34) define an angle of about 55° in vertical cross section with respect to a horizontal plane.

17. A unitary resilient support pad (22) formed by a solid block of resilient material having an upright axis, a base portion (24), an intermediate portion (26), and a cap portion (28) each having cross sections normal to the axis with continuously rounded peripheries, the base portion (24) being of an upright columnar configuration and defining a peripheral wall surface (23) and a bottom surface (25), the intermediate portion (26) having an outer annular wall surface (34) sloping generally inwardly toward the axis from an intersection with the peripheral wall surface (23) of the base portion (24) to an intersection with the cap portion (28), the cap portion (28) being of a general domed configuration, and the support pad (22) being of a construction sufficient for radial outward deflection while maintaining a hinging action solely at the intersection of the peripheral wall surface (23) and the bottom surface (25) in response to an increasing load on the cap portion (28).

18. The support pad of claim 17 wherein the intermediate portion (26) is a frustum and the annular wall surface (34) defines a preselected angle $\phi$ of about 55° in vertical cross section with respect to a horizontal plane.

19. The support pad of claim 17 wherein the maximum compression travel is in the range of about 20% to 40% of the overall height Ht.

20. The support pad of claim 17 wherein the support pad is of a construction sufficient for providing load deflection properties at which the load deflection curve at maximum expected load is substantially vertical.

21. The support pad (22) of claim 17 wherein the base portion (24) is about 9% of the overall height Ht, the intermediate portion (26) is about 68% of the overall height Ht, and the cap portion (28) is about 23% of the overall height Ht.

22. A unitary resilient support pad (22) formed by a solid block of resilient material having an upright axis, a base portion (24), an intermediate portion (26), and a cap portion (28) each having cross sections normal to the axis with continuously rounded peripheries, the base portion (24) being of an upright columnar configuration and defining a peripheral wall surface (23) and a bottom surface (25), the intermediate portion (26) having an outer annular wall surface (34) sloping generally inwardly toward the axis from an intersection with the peripheral wall surface (23) of the base portion (24) to an intersection with the cap portion (28), the cap portion (28) being of a general domed configuration, and the support pad (22) being of a construction sufficient for deflection of substantially the entire cap portion (28) to a substantially planar surface.

23. The support pad of claim 22 wherein the support pad is of a construction sufficient for radial outward deflection while maintaining a hinging action solely at the intersection of the peripheral wall surface (23) and the bottom surface (25) in response to an increasing load on the cap portion (28).

24. The support pad of claim 23 including a supporting plate (30), and wherein the bottom surface (25) of the base portion (24) is bonded to the supporting plate (30), and wherein the support pad and supporting plate are in use releasably connected to a vehicle frame member (14) as a unit.

* * * * *